United States Patent [19]

Mitchell et al.

[11] Patent Number: 5,614,013
[45] Date of Patent: Mar. 25, 1997

[54] PIGMENT COMPOSITIONS

[75] Inventors: Gordon Mitchell, Kilbarchan; Iain F. Fraser, Kilbirnie; Robert Langley, Glasgow, all of Scotland

[73] Assignee: Ciba-Geigy Corporation, Tarrytown, N.Y.

[21] Appl. No.: 324,827

[22] Filed: Oct. 18, 1994

[30] Foreign Application Priority Data

Oct. 20, 1993 [GB] United Kingdom ............ 9321659
May 7, 1994 [GB] United Kingdom ............ 9409099

[51] Int. Cl.$^6$ .................................................. C09B 27/00
[52] U.S. Cl. .................. 106/494; 106/22 K; 106/493; 106/496
[58] Field of Search ............... 106/496, 494, 106/22 K, 493

[56] References Cited

U.S. PATENT DOCUMENTS

| | | | |
|---|---|---|---|
| 3,725,101 | 4/1973 | Kuhne et al. ................ | 106/494 |
| 4,014,866 | 3/1977 | Henning ....................... | 534/884 |
| 4,334,932 | 6/1982 | Roueche ....................... | 524/191 |
| 5,144,014 | 9/1992 | Sugamee et al. ............ | 534/573 |

FOREIGN PATENT DOCUMENTS

| | | |
|---|---|---|
| 039307 | 11/1981 | European Pat. Off. . |
| 2084545 | 12/1971 | France . |
| 2156778 | 6/1973 | France . |
| 2564099 | 5/1985 | France . |
| 1313147 | 4/1973 | United Kingdom . |
| 2160212 | 12/1985 | United Kingdom . |

OTHER PUBLICATIONS

Chem Abst. 115:185370e (1991) of JP 397,762 (No Month).

*Primary Examiner*—Mark L. Bell
*Assistant Examiner*—Scott L. Hertzog
*Attorney, Agent, or Firm*—Michele A. Kovaleski

[57] ABSTRACT

A pigment composition comprising (A) an azo pigment, (B) an azo reaction product of (i) a diazonium salt of a primary aromatic amine having a carboxyl group or sulphonic acid group meta or para to an amino group with (ii) a coupling component comprising one or more unsubstituted or substituted naphthols, at least 50 mole % of said coupling component being a naphtholsulphonic acid, or a salt of said reaction product, and, optionally, (C) an organic resin containing an acidic group or a salt thereof.

19 Claims, No Drawings

PIGMENT COMPOSITIONS

This invention relates to pigment compositions, their preparation and their use.

In GB 2 160 212A there are described azo pigment compositions comprising a compound obtained by coupling a diazonium salt of a benzene- type amine having a carboxyl group or sulphonic group at the meta or para position with respect to the amino group and beta-naphthol or beta-hydroxynaphthoic acid, or a metal or organic amine salt of this compound, and a naphthol-type azo pigment. Such compositions are said to improve the stability of the pigment against recrystallisation. It is stated that when a beta-naphthol coupling component used in the preparation of such compositions is replaced by a mixture of 97.5 mole % of beta-naphthol and 2.5 mole % of 2-naphthol-5-sulphonic acid, the resulting pigment composition has inferior colouring power (colour strength).

It has now surprisingly been found that pigment compositions having excellent colour strength, as well as very good transparency and flow properties, which are particularly useful in the formulation of printing inks, especially publication gravure inks, can be obtained by preparing an azo pigment modified by a product obtainable by coupling a diazonium salt of an aromatic primary amine having a carboxyl group or a sulphonic acid group meta or para to an amino group with a phenolic coupling component comprising at least 50 mole % of a naphtholsulphonic acid, particularly when the thus modified pigment is also resinated with organic resins conventionally used for the resination of pigments.

Accordingly, the present invention provides, in one aspect, a pigment composition comprising (A) an azo pigment, (B) an azo reaction product of (i) a diazonium salt of a primary aromatic amine having a carboxyl group or sulphonic acid group meta or para to an amino group with (ii) a coupling component comprising one or more unsubstituted or substituted naphthols, at least 50 mole % of said coupling component being a naphtholsulphonic acid, or a salt of said azo reaction product, and, optionally, (C) an acidic group-containing organic resin or a salt thereof.

The azo pigment (A), which is different from the azo product (B), may be a pigment derived from a diazonium salt of a primary aromatic amine and a coupling component. Preferably (A) is an azo metal salt pigment, more preferably such a metal salt pigment, especially a calcium salt pigment, derived from a diazonium salt of a primary aromatic amine substituted on the aromatic nucleus, preferably ortho to the amino group, by an acidic group, particularly a sulphonic acid group, and a beta-naphthol coupling component which may be beta-naphthol itself, a substituted beta-naphthol, particularly a beta-naphthol substituted by a carboxyl group such as beta-hydroxynaphthoic acid (BONA), or a mixture thereof. Suitable such substituted amines and such beta-naphthol coupling components are well known to those familiar with the production of azo metal salt pigments and are preferably those conventionally used in the production of such pigments. Thus preferred amines include 2-amino-4-chloro-5-methylbenzenesulphonic acid (2B Acid), 2-amino-4-methyl-5-chlorobenzenesulphonic acid (C Acid), 2-amino-4-ethyl-5-chlorobenzenesulphonic acid (Ethyl C Acid) and 2-amino-5-methylbenzenesulphonic acid (4B Acid), while preferred beta-naphthol coupling components include beta-naphthol itself and beta-hydroxynaphthoic acid (BONA). Preferred pigments (A) thus include Pigment Red 48, particularly as the calcium salt (48:2), Pigment Red 49, particularly as the calcium salt (49:2), Pigment Red 52, particularly as the calcium salt (52:1), Pigment Red 53, particularly as the calcium salt (53:2), Pigment Red 63, particularly as the calcium salt (63:1) and, especially, Pigment Red 57, especially as the calcium salt (57:1). The azo pigment (A) may be a mixture of two or, more pigments, for example a mixture of two or more metal salt pigments as hereinbefore described. It may be a metal salt pigment derived from a beta-naphthol coupling component and two or more diazonium salts of primary aromatic amines, each substituted as hereinbefore described, for example a major amount of a diazonium salt of a first such amine (the major amine) and a minor amount of a diazonium salt of a second such amine (the minor amine). The minor amine may be used, for example, to modify the shade of the pigment (A). The minor amine may be used in an amount generally from 0.5 to 15%, preferably from 1 to 10%, especially from 2 to 6%, by weight of the major amine. In some especially preferred embodiments, where the pigment (A) is a shaded Pigment Red 57, the major amine is 2-amino-5-methylbenzenesulphonic acid and the minor amine is 2-amino-1-naphthalenesulphonic acid.

The amine from which the diazonium salt component of the azo reaction product (B) is derived may have no further substituents on the aromatic nucleus or may have one or more further substituents, such as halogen, hydroxy, nitro, acetylamino, $C_1$–$C_4$ alkyl or $C_1$–$C_4$ alkoxy, on the aromatic nucleus. Thus suitable such amines include m-aminobenzoic acid, p-aminobenzoic acid, 2-chloro-4-aminobenzoic acid, 2-hydroxy-5-aminobenzoic acid, 2-nitro-5-aminobenzoic acid, 3-amino-4-acetylaminobenzoic acid, 3-amino-4-methylbenzoic acid, metanilic acid, sulphanilic acid, 2-chloro-5-aminobenzenesulphonic acid, 2-hydroxy-5-aminobenzenesulphonic acid, 2-nitro-4-aminobenzenesulphonic acid, 3-acetylamino-5-aminobenzenesulphonic acid, 2-methyl-4-aminobenzenesulphonic acid, 2-methoxy-5-aminobenzenesulphonic acid and mixtures of two or more thereof. Amines having a chlorine substituent or no further substituent on the aromatic nucleus are preferred, as are amines having a sulphonic acid group meta or para to the amino group. Especially preferred amines are metanilic acid, sulphanilic acid and 2-chloro-5-aminobenzenesulphonic acid.

The diazonium salt of the amine may be prepared by diazotisation of the amine or a salt thereof using conventional procedures.

The naphtholsulphonic acid comprising at least 50 mole % of the coupling component (ii) is preferably a beta-naphtholsulphonic acid such as 2-naphthol-3-sulphonic acid, 2-naphthol-4-sulphonic acid, 2-naphthol-5-sulphonic acid, 2-naphthol-6-sulphonic acid, 2-naphthol-7-sulphonic acid, 2-naphthol-8-sulphonic acid, 2-naphthol-3, 6- disulphonic acid, 2-naphthol-3, 7-disulphonic acid, 2-naphthol-4, 7-disulphonic acid, 2-naphthol-6,8-disulphonic acid, or a mixture of two or more thereof. An especially preferred naphtholsulphonic acid is 2-naphthol-6-sulphonic acid.

The remainder of the coupling component (ii) may consist of one or more further beta-naphthol coupling compounds such as beta-naphthol itself or a substituted beta-naphthol, particularly a carboxyl-substituted beta-naphthol such as beta-hydroxynaphthoic acid. Preferably, the coupling component (ii) comprises at least 75 mole % of the naphtholsulphonic acid. In especially preferred embodiments of the invention, the naphtholsulphonic acid comprises substantially all of the coupling component (ii).

Especially preferred azo products (B) are dyestuffs obtained by coupling 2-naphthol-6-sulphonic acid with a diazonium salt of metanilic acid, sulphanilic acid or 2-chloro-5-aminobenzenesulphonic acid.

The azo reaction product (B) may be prepared from the diazonium salt (i) and the coupling component (ii) by a coupling reaction, for which conventional procedures can be used. As will be apparent to those skilled in the art, such coupling reactions are carried out in alkaline solution, so that the carboxyl group or sulphonic acid group in the diazonium salt reactant and the sulphonic acid group in the naphtholsulphonic acid reactant are present in the reaction medium as the corresponding anions. Consequently, the azo product (B) can be obtained as an alkali metal salt, especially a sodium salt. Depending on the method used to prepare the compositions of the invention, on the final pH used in preparing the compositions and on the nature of the metal ion added to precipitate the pigment (A) in a wet processing method, the azo product (B) can be present in the final composition as an acid, an alkali metal salt, an amine salt, an alkaline earth metal salt or a manganese salt, or as a mixture of two or more of these forms.

The acidic group-containing organic resin (C) may be a resin known for its use in the resination of azo pigments. Such resins include rosins, which may be gum rosins, wood rosins or tall oil rosins, rosin derivatives such as rosin esters, hydrogenated rosins, disproportionated rosins, dimerised rosins or polymerised rosins, phenolic resins and carboxyl-containing maleic or fumaric resins. The resin (C) is preferably a rosin, especially a tall oil rosin or a disproportionated rosin. Depending on the method used to prepare the compositions of the invention, and on the nature of the metal ion added to precipitate the pigment (A) in a wet processing method, the resin (C) may be present in the composition of the invention as an acid or as an insoluble metal or amine salt thereof.

In compositions of the invention, the azo reaction product (B) is generally present in an amount of 0.5 to 20%, preferably 1 to 10%, especially 4 to 6%, by weight of the pigment (A). The resin (C) is generally present in an amount of 0.1 to 25%, preferably 1 to 15%, especially 5 to 10%, by weight of the pigment (A). Conventional additives for pigment compositions, e.g. surfactants, may be included in compositions of the invention, in conventional amounts.

The present invention provides, in another aspect, a method of preparing a pigment composition which comprises (a) forming an azo pigment (A) as hereinbefore defined in an aqueous alkaline medium containing an azo reaction product (B) as hereinbefore defined, thereby obtaining a dispersion of modified pigment in an aqueous alkaline medium, (b) optionally dissolving an acidic group-containing organic resin (C) as hereinbefore defined, or a water-soluble salt thereof, in the aqueous alkaline medium before or after pigment formation, (c) where step (b) is carried out, precipitating the organic resin (C), and (d) separating solid pigment composition from the product obtained in step (a) or, where step (b) is carried out, from the product obtained in step (c).

Where the pigment (A) is a salt of a product of a coupling reaction of a diazonium salt of an amine having a carboxyl or sulphonic acid group with an unsubstituted or substituted naphthol coupling component, for example an azo metal salt pigment as hereinbefore described, step (a) may be effected by carrying out the coupling reaction in an aqueous alkaline medium to give a solution or suspension of pigment precursor in said medium, the azo reaction product (B) being dissolved in said medium before (preferred) or after the coupling reaction is carried out, and adding an alkaline earth metal salt or a manganese salt to said solution or suspension to precipitate the pigment. This salt may be added as a solid, or as an aqueous solution or dispersion. Where, as in more preferred embodiments, the pigment (A) is derived from a diazonium salt of an amine substituted on the aromatic nucleus by a sulphonic acid group and a substituted or unsubstituted beta-naphthol coupling component, a calcium salt, especially calcium chloride, is preferably added to the alkaline solution or suspension of the pigment precursor to precipitate the pigment. In this latter embodiment, a calcium salt of the azo reaction product (B) may be co-precipitated or a solvated form of (B) may be adsorbed on the Surface of the precipitated pigment.

Where the pigment (A) is derived from two or more diazonium salts, the different diazonium salts may be reacted separately with the coupling component and the products of the separate coupling reactions then mixed together before precipitation of the pigment. Preferably, however, a mixture of amines is diazotised to give a mixture of diazonium salts, which mixture is then reacted with the coupling component to give the pigment precursor.

When used, the organic resin (C) may be dissolved in the aqueous alkaline medium before or after pigment formation. When, as is preferred, it is incorporated before pigment formation, it may be dissolved in the aqueous alkaline medium before or after the coupling reaction is carried out. Conveniently it is dissolved in this medium prior to the coupling reaction. When the resin (C) is dissolved in the aqueous alkaline medium before formation of the pigment and a metal salt is added to precipitate the pigment, some or all of the resin (C) may be co-precipitated.

Precipitation of at least some of resin (C) may be alternatively or additionally effected by adding a metal salt or an amine to the aqueous alkaline medium after formation of the pigment (A), i.e. to the aqueous alkaline medium containing the precipitated pigment, to convert at least some of the resin (C) into the form of an insoluble metal or amine salt, and/or by reducing the pH of the alkaline medium after pigment formation to a level at which at least some of the resin (C) is converted into free acid form, the dispersion of the pigment in the aqueous alkaline medium preferably being stirred to maximise uniformity of deposition of the resin (C) on the pigment particles.

Suitable metal salts and amines which can be used for the precipitation of resin (C) are well known to those skilled in the art of pigment resination. Thus suitable metal salts include water-soluble alkaline earth and manganese salts, particularly chlorides. Suitable amines include aliphatic amines having at least 8 carbon atoms, for example stearylamine, palmitylamine, laurylamine, oleylamine, linoleylamine and commercially available amines such as tallow amine, coco amine and soya amine which are usually mixtures of these aliphatic amines; distearylamine, dipalmitylamine, dioleylamine, N-palmityl-N-oleylamine and commercially available mixtures of these amines; long chain alkylenediamines such as N-stearylpropylenediamine and commercially available mixtures of such amines; resin amines such as polyaminoamides; and aryl- and aralkyl-substituted monoamines and diamines such as phenylstearylamine and N-phenylstearylpropylenediamine. The amines are preferably used in the form of their water-soluble salts such as chlorides or acetates. Quaternary ammonium salts can also be used.

After precipitation of the pigment and, where present, the organic resin (C), the solid pigment composition of the invention can be separated from the resulting slurry using conventional procedures. Usually the slurry is filtered to give a presscake which is then dried, optionally preceded by granulation and followed by sieving. The resulting pigment composition is ready for use in pigmenting a high molecular weight material.

Pigment compositions according to the invention are particularly suitable for use in the pigmentation of surface coating compositions such as printing inks, especially publication gravure inks. Accordingly, the present invention also provides a surface coating composition, preferably a printing ink, especially a publication gravure ink, pigmented with an effective colouring amount, preferably 1 to 20%, especially 5 to 15%, by weight, based on the total surface coating composition, of a pigment composition of the invention as hereinbefore described.

The surface coating composition may contain, as binder, a natural or synthetic resin such as rosin, shellac, rosin esters, cellulose esters or ethers, hydrocarbon resins, epoxy resins, phenolic resins, metal resinates, aminoplasts, polyesters, polyamides, polyacrylates or polystyrenes. Where the surface coating composition is a printing ink, it may contain a liquid vehicle such as one or more organic liquids conventionally used in printing inks, for example an aromatic hydrocarbon such as benzene, toluene or xylene, a halohydrocarbon such as chlorobenzene, a ketone such as acetone, methyl ethyl ketone, methyl isobutyl ketone, cyclohexanone or acetophenone, an alcohol such as ethanol, isopropanol, n-butanol, ethylene glycol or 2-ethoxyethanol, an ester such as ethyl acetate or 2-ethoxyethyl acetate, or a mixture of two or more thereof.

Preparation of the surface coating composition may be carried out in a conventional manner. For example, where it is a printing ink, it may be prepared by dispersing a pigment composition of the invention into a mixture of a resin binder and an organic liquid vehicle in a dispersing apparatus such as a ball mill or bead mill which contains grinding material e.g. glass beads.

The invention is illustrated by the following Examples.
The dyestuffs used in the Examples are prepared as follows:
Dyestuff 1

2-Chloro-5-aminobenzenesulphonic acid (41.4 g) is dispersed in water (288 ml) and 47% aqueous sodium hydroxide solution (17.5 g) is added. The mixture is heated to 40° C. and stirred until a complete solution is obtained. This Solution is cooled to 0° C. by the addition of ice. A solution of sodium nitrite (13.8 g) in water (23 ml) is added, followed by 36% aqueous hydrochloric acid (39 ml). The diazotised slurry obtained is stirred for 36 minutes while the temperature is maintained at 0° C.

2-Naphthol-6-sulphonic acid (44.8 g) is dissolved at 40° C. in water (240 ml) and 47% aqueous sodium hydroxide (35.2 g). The solution is cooled to 10° C. and the diazotised slurry is added over 29 minutes. The resulting dyestuff is obtained as an aqueous suspension.
Dyestuff 2

The procedure used for the preparation of Dyestuff 1 is repeated, but replacing the 2-chloro-5-aminobenzenesulphonic acid by metanilic acid (34.6 g). The resulting dyestuff is obtained as an aqueous solution.

EXAMPLE 1

To a dispersion of 2-amino-5-methylbenzenesulphonic acid (37.4 g) in water (290 ml) is added 47% aqueous sodium hydroxide solution (17.5 g). The mixture is heated at 39° C. and stirred until a complete solution is obtained. This solution is cooled to 0° C. by the addition of ice. A solution of sodium nitrite (13.8 g) in water (25 ml)is added, followed by 36% aqueous hydrochloric acid (37.5 ml). The diazotised slurry obtained is stirred for 47 minutes while the temperature is maintained at 0° C.

2-Hydroxy-3-naphthoic acid (37.6 g) is dissolved at 40° C. in water (240 ml) and 47% aqueous sodium hydroxide (21.3 g). To the solution are added Dyestuff 1 ( 110.7 ml of suspension containing 4.9 g of solid dyestuff) and then a solution of Beviros 95—a tall oil rosin available from Bergvik Kemi AB—(9.1 g) in water (165 ml) and 47% aqueous sodium hydroxide (2.4 g) at 70° C. The solution obtained is cooled to 10° C. and further 47% aqueous sodium hydroxide (14.3 g) is added. The diazotised slurry is then added, with stirring, over 30 minutes. Solid calcium chloride (63.4 g) is added to the suspension obtained and stirring is continued for 60 minutes, while maintaining a temperature of 12°–14° C. The pH of the resulting pigment slurry is adjusted to 7.3 by the addition of dilute hydrochloric acid. The slurry is then heated to 70° C. over 13 minutes and held at this temperature for 10 minutes. The heated slurry is filtered and the presscake obtained is washed with water, granulated, dried at 70° C. and roasted at 90° C. The resulting granules are sieved through a 250 μm screen to give a powdered pigment composition.

EXAMPLE 2

The procedure of Example 1 is repeated, but replacing the Dyestuff 1 suspension by Dyestuff 2 (102 ml of solution containing 4.5 g of solid dyestuff).

EXAMPLE 3

The procedure of Example 1 is repeated, but replacing the Dyestuff 1 suspension by an aqueous solution containing 4.5 g of a commercially available dyestuff obtained by reacting a diazonium salt of sulphanilic acid with 2-naphthol-6-sulphonic acid.

EXAMPLES 4–6

Printing inks are prepared by dispersing the pigment compositions obtained in Examples 1 to 3 in a toluene-zinc/calcium resinate gravure ink vehicle, using a ballmill. A control ink is prepared by similarly dispersing in the same vehicle a control pigment composition prepared by the procedure of Example 1, but omitting Dyestuff 1. The resulting inks are printed on sheets of coated paper and visually assessed for colour strength. The results are given below, expressed as percentages taking the colour strength of the control ink as 100%, higher values denoting higher colour strength.

| Example | Pigment Composition | Colour Strength |
| --- | --- | --- |
| Control | Control | 100% |
| 4 | Example 1 | 110% |
| 5 | Example 2 | 110% |
| 6 | Example 3 | 105% |

EXAMPLE 7

To a dispersion of 2-amino-5-methylbenzenesulphonic acid (35.9 g) and 2-amino-1-naphthalenesulphonic acid (1.8 g) in water (295 ml) is added 47% aqueous sodium hydroxide solution (17.9 g). The mixture is heated at 30° C. and stirred until a complete solution is obtained. This solution is cooled to 0° C. by the addition of ice. A solution of sodium nitrite (14.1 g) in water (25 ml) is added, followed by 36% aqueous hydrochloric acid (45 g). The diazotised slurry obtained is stirred for 30 minutes while the temperature is maintained at 0° C.

2-hydroxy-3-naphthoic acid (37.6 g) is dissolved at 40° C. in water (250 ml) and 47% aqueous sodium hydroxide (21.3 g). To the solution are added Dyestuff 2 (47.7 g of solution containing 4.4 g of solid dyestuff) and then a solution of Beviros 95 (9.1 g) in water (165 ml) and 47% aqueous sodium hydroxide (2.5 g) at 70° C. The solution obtained is cooled to 10° C. and further 47% aqueous sodium hydroxide (14.3 g) is added. The diazotised slurry is then added, with stirring, over 25 minutes. Solid calcium chloride (63.4 g) is added to the suspension obtained and stirring continued for 120 minutes while maintaining a temperature of 12°–14° C. The resulting pigment slurry is heated to 70° C. over 120 minutes and held at this temperature for 10 minutes. The pH of the slurry is then adjusted to 7.3 by the addition of dilute hydrochloric acid. The heated slurry is filtered and the presscake obtained is washed with water, granulated, dried at 70° C. and roasted at 90° C. The resulting granules are sieved through a 250 µm screen to give a powered pigment composition.

A printing ink is prepared by dispersing the powdered pigment composition in a toluene-zinc/calcium resinate gravure vehicle, using a ballmill. A control ink is prepared by similarly dispersing in the same vehicle a control pigment composition prepared by the above procedure, but omitting Dyestuff 2. The resulting inks are printed on sheets of coated paper and assessed visually for colour strength.

The results are as follows:

| Pigment Composition | Colour Strength |
| --- | --- |
| Control | 100% |
| Example 7 | 105% |

EXAMPLE 8

To a dispersion of 2-amino-5-methylbenzenesulphonic acid (2.39 parts) in water (18.40 parts) is added 47% aqueous sodium hydroxide solution (1.12 parts). The mixture is heated at 30° C. and stirred until a complete solution is obtained. The solution is cooled to 0° C. by the addition of ice. A solution of sodium nitrite (0.88 parts) in water (1.4 parts) is added, followed by 36% aqueous hydrochloric acid (2.40 parts). The diazotised slurry obtained is stirred for 70 minutes while the temperature is maintained at 0° C.

2-hydroxy-3-naphthoic acid (2.40 parts) is dissolved at 40° C. in water (15.40 parts) and 47% aqueous sodium hydroxide (1.36 parts). To the solution are added Dyestuff 1 (6.31 parts of suspension containing 0.28 part of solid dyestuff) and then a solution of Beviros 95 (0.57 part) in water (10.2 parts) and 47% aqueous sodium hydroxide (0.16 part) at 70° C. The solution obtained is cooled to 10° C. and a solution of Empicol LX—a sodium lauryl sulphate surfactant from Albright and Wilson Ltd—(0.28 part) in water (2.80 parts) is added, followed by further 47% aqueous sodium hydroxide (1.06 part). The diazotised slurry is then added with stirring over 35 minutes. Solid calcium chloride (3.95 parts) is added to the suspension obtained and stirring is continued for 60 minutes, while maintaining a temperature of 12–14° C. The slurry is then heated to 50° C. over 60 minutes and held at this temperature for 10 minutes. The pH is then adjusted to 7.2 by the addition of dilute hydrochloric acid. The heated slurry is filtered and the presscake obtained is washed with water, granulated, dried at 70° C. and roasted at 90° C. The resulting granules are sieved through a 250 µm screen to give a powered pigment composition suitable for use in a printing ink.

What is claimed is:

1. A pigment composition comprising (A) an azo metal salt pigment, (B) an azo reaction product of (i) a diazonium salt of a primary aromatic amine having a carboxyl group or sulfonic acid group meta or para to an amino group with (ii) a coupling component comprising one or more unsubstituted or substituted naphthols, at least 50 mole % of said coupling component being a naphtholsulfonic acid, or a salt of said reaction product, and, optionally, (C) an organic resin containing an acidic group or a salt thereof.

2. A composition according to claim 1, in which (A) is derived from a diazonium salt of a primary aromatic amine substituted ortho to the amino group by an acidic group and a beta-naphthol coupling component; or (A) is derived from two or more diazonium salts of primary aromatic amines, each substituted ortho to the amino group by an acidic group, and a beta-naphthol coupling component.

3. A composition according to claim 1 in which the diazonium salt (i) is derived from an amine having a chlorine substituent or no further substituent on an aromatic nucleus.

4. A composition according to claim 1, in which the diazonium salt (i) is derived from an amine having a sulfonic acid group meta or para to the amino group.

5. A composition according to claim 1, in which the naphtholsulfonic acid is a beta-naphtholsulfonic acid.

6. A composition according to claim 1, in which at least 75 mole % of the coupling component (ii) is the naphtholsulfonic acid.

7. A composition according to claim 1, in which the naphtholsulfonic acid comprises substantially all of the coupling component (ii).

8. A composition according to claim 1, in which the azo reaction product (B) is a dyestuff obtained by coupling 2-naphthol-6-sulfonic acid with a diazonium salt of metanilic acid, sulfanilic acid or 2-chloro-5-aminobenzenesulfonic acid.

9. A composition according to claim 1, in which the organic resin (C) is a rosin.

10. A composition according to claim 1, in which the azo reaction product (B) is present in an amount of 0.5 to 20% by weight of the pigment (A).

11. A composition according to claim 10, in which (B) is present in an amount of 1 to 10% by weight of the pigment (A).

12. A composition according to claim 1, in which the organic resin (C) is present in an amount of 0.1 to 25% by weight of the pigment (A).

13. A pigment composition according to claim 1, present in an effective colouring amount in a surface coating composition.

14. A pigment composition according to claim 13, in which the surface coating composition is a printing ink.

15. A method of preparing a pigment composition which comprises (a) forming an azo metal salt pigment (A) in an aqueous alkaline medium containing an azo reaction product (B) of (i) a diazonium salt of a primary aromatic amine having a carboxyl group or sulfonic acid group meta or para to an amino group with (ii) a coupling component comprising one or more unsubstituted or substituted naphthols, at least 50 mole % of said coupling component being a naphtholsulfonic acid, or a salt of said reaction product, thereby obtaining a dispersion of modified pigment in an aqueous alkaline medium, (b) optionally dissolving (C) an acidic group-containing organic resin or a water-soluble salt thereof, in the aqueous alkaline medium before or after pigment formation, (c) where step (b) is carried out, precipitating the organic resin (C) and (d) separating solid pigment composition from the product obtained in step (a) or, where step (b) is carried out, from the product obtained in step (c).

16. A method according to claim 15, in which the pigment (A) is an azo metal salt pigment and step (a) is effected by carrying out a coupling reaction of a diazonium salt of an aromatic amine having a carboxyl or sulfonic acid group with an unsubstituted or substituted naphthol coupling component in an aqueous alkaline medium to give a solution or suspension of pigment precursor in said medium, the azo reaction product (B) being dissolved in said medium before or after the coupling reaction is carried out, and adding an alkaline earth metal salt or a manganese salt to said solution or suspension to precipitate the pigment.

17. A method according to claim 16, in which the pigment (A) is derived from at least one diazonium salt of an amine substituted by a sulfonic acid group and a calcium salt is added to said solution or suspension to precipitate the pigment.

18. A method according to claim 15, in which the organic resin (C) is dissolved in the aqueous alkaline medium before pigment formation, an alkaline earth metal salt or manganese salt is added to precipitate the pigment (A) and at least some of the resin (C) is co-precipitated.

19. A method according to claim 15, in which step (b) is carried out and at least part of resin (C) is precipitated by adding a metal salt or an amine to the aqueous alkaline medium after formation of the pigment (A) to convert at least part of the resin (C) into the form of an insoluble metal or amine salt and/or by reducing the pH of the aqueous alkaline medium after pigment formation to a level at which at least part of the resin (C) is convened into free acid form.

* * * * *